United States Patent
Wei

(10) Patent No.: US 9,572,040 B2
(45) Date of Patent: Feb. 14, 2017

(54) UNLICENSED SPECTRUM SHARING METHOD, BASE STATION USING THE SAME, AND USER EQUIPMENT USING THE SAME

(71) Applicant: Acer Incorporated, New Taipei (TW)

(72) Inventor: Hung-Yu Wei, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 14/708,296

(22) Filed: May 11, 2015

(65) Prior Publication Data

US 2015/0245219 A1    Aug. 27, 2015

Related U.S. Application Data

(63) Continuation-in-part of application No. 14/277,813, filed on May 15, 2014.
(Continued)

(51) Int. Cl.
*H04W 16/14*    (2009.01)
*H04W 72/04*    (2009.01)
(Continued)

(52) U.S. Cl.
CPC ........... *H04W 16/14* (2013.01); *H04B 7/2656* (2013.01); *H04L 5/001* (2013.01); *H04L 5/0073* (2013.01);
(Continued)

(58) Field of Classification Search
USPC ........................................................ 370/329
See application file for complete search history.

(56) References Cited

U.S. PATENT DOCUMENTS

| 2012/0039284 A1* | 2/2012 | Barbieri ................ H04W 48/10 370/329 |
| 2014/0023016 A1* | 1/2014 | Mildh ................... H04L 5/0096 370/329 |

(Continued)

FOREIGN PATENT DOCUMENTS

| TW | 201129188 | 8/2011 |
| WO | 2012152298 | 11/2012 |

OTHER PUBLICATIONS

"3rd Generation Partnership Project; Technical Specification Group Radio Access Network; Study on Licensed-Assisted Access to Unlicensed Spectrum; (Release 13)," 3GPP TR 36.889 V0.3.1, Feb. 2015.

(Continued)

*Primary Examiner* — Edan Orgad
*Assistant Examiner* — Sithu Ko
(74) *Attorney, Agent, or Firm* — Jianq Chyun IP Office

(57) ABSTRACT

The disclosure is directed to an unlicensed spectrum sharing method that is applicable to a user equipment and a base station, a user equipment using the same method, and a base station using the same method. In one of the exemplary embodiments, the disclosure is directed to an unlicensed spectrum sharing method applicable to a user equipment. The method would include receiving a configuration message over a first component carrier in a licensed spectrum to operate in an unlicensed spectrum, receiving a user message of the UE over a second component carrier in the unlicensed spectrum in response to receiving the configuration message, wherein the first component carrier and the second component carrier are aggregated carriers, and receiving a re-configuration message over the first component carrier in the licensed spectrum to operate in the unlicensed spectrum.

15 Claims, 12 Drawing Sheets

Related U.S. Application Data

(60) Provisional application No. 61/894,138, filed on Oct. 22, 2013, provisional application No. 61/902,298, filed on Nov. 11, 2013, provisional application No. 61/922,102, filed on Dec. 31, 2013, provisional application No. 61/922,105, filed on Dec. 31, 2013, provisional application No. 62/011,579, filed on Jun. 13, 2014.

(51) Int. Cl.
*H04L 5/00* (2006.01)
*H04B 7/26* (2006.01)
*H04W 72/12* (2009.01)
*H04W 28/18* (2009.01)

(52) U.S. Cl.
CPC .......... *H04L 5/0087* (2013.01); *H04L 5/0098* (2013.01); *H04W 72/1215* (2013.01); *H04W 28/18* (2013.01)

(56) References Cited

U.S. PATENT DOCUMENTS

| | | | |
|---|---|---|---|
| 2014/0036818 A1* | 2/2014 | Koskela | H04W 72/042 370/329 |
| 2014/0098774 A1* | 4/2014 | Gao | H04L 5/001 370/329 |
| 2014/0341024 A1* | 11/2014 | Bhushan | H04L 5/005 370/230.1 |
| 2015/0085792 A1* | 3/2015 | Reddy | H04W 16/14 370/329 |

OTHER PUBLICATIONS

"3GPP TSG RAN WG2 #89 R2-150234," Feb. 9-13, 2015, Athens, Greece.

* cited by examiner

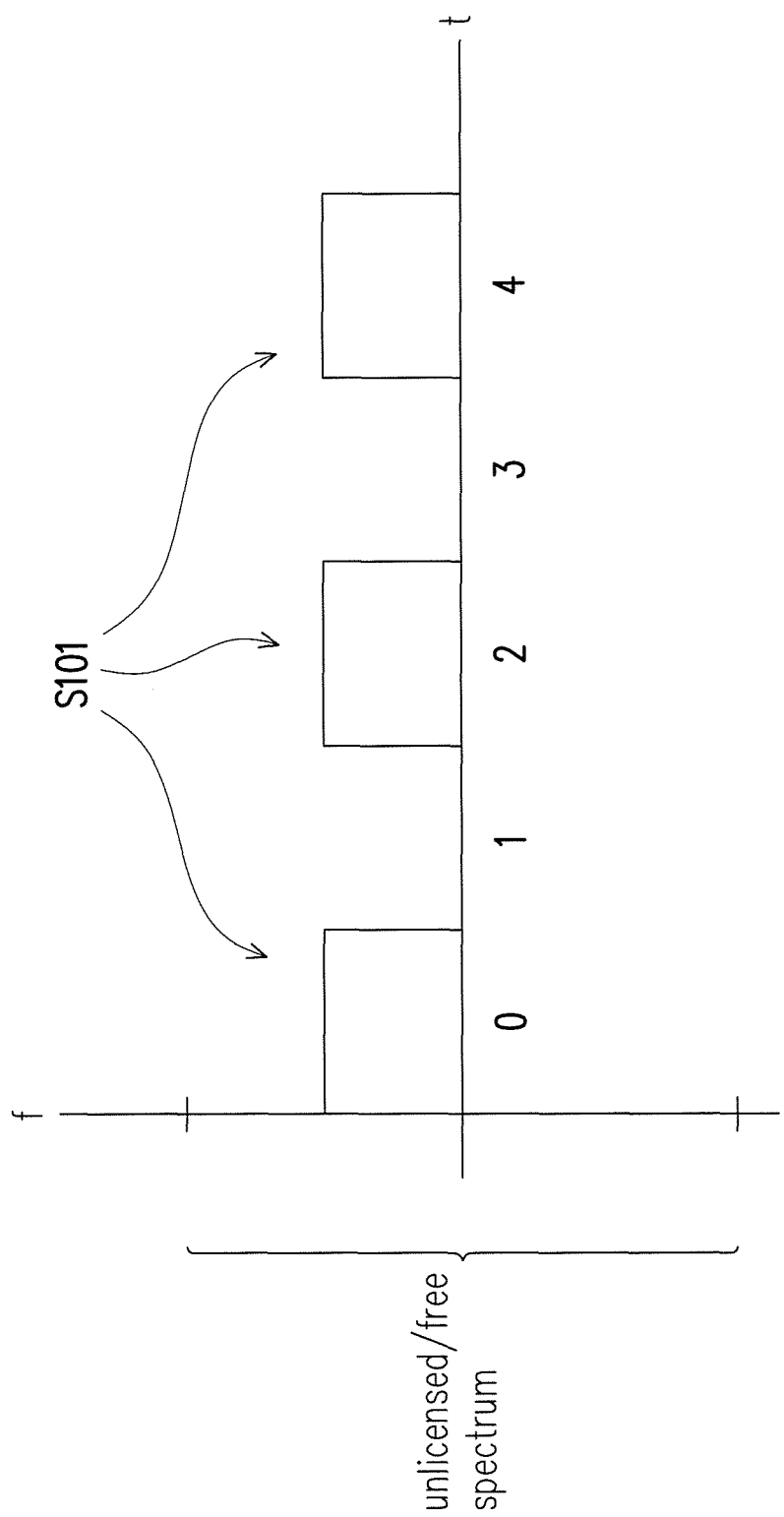

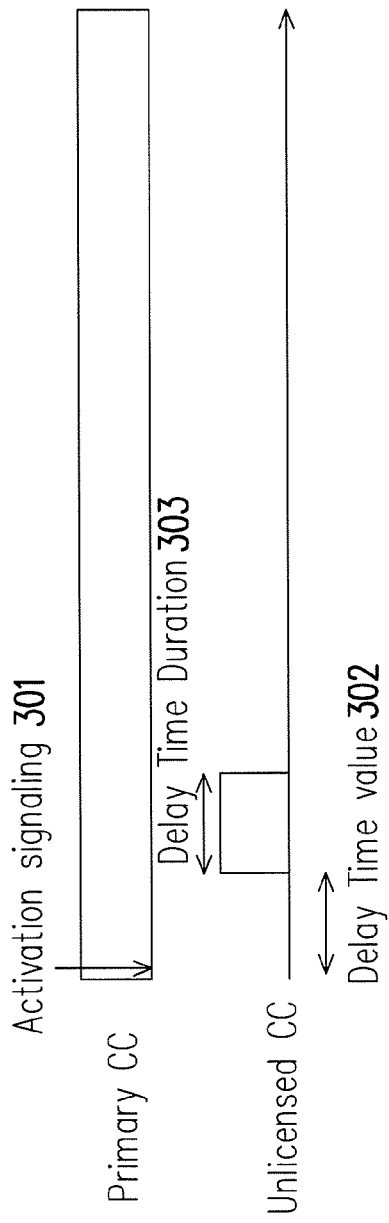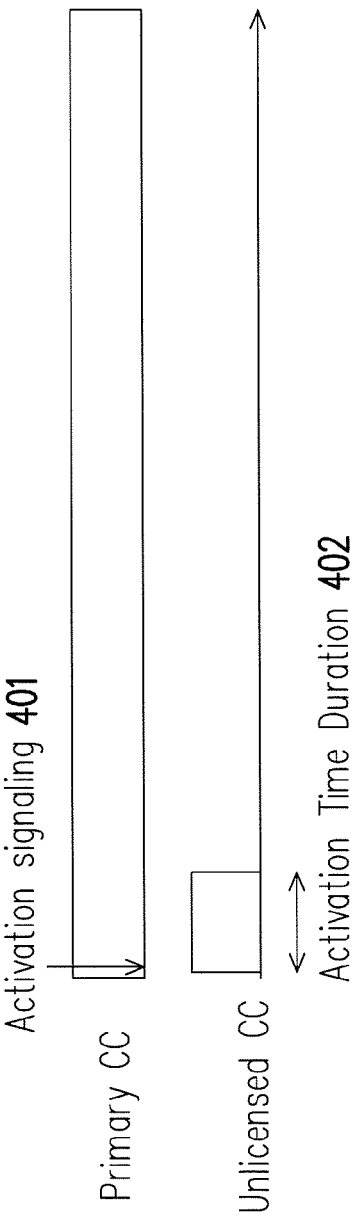

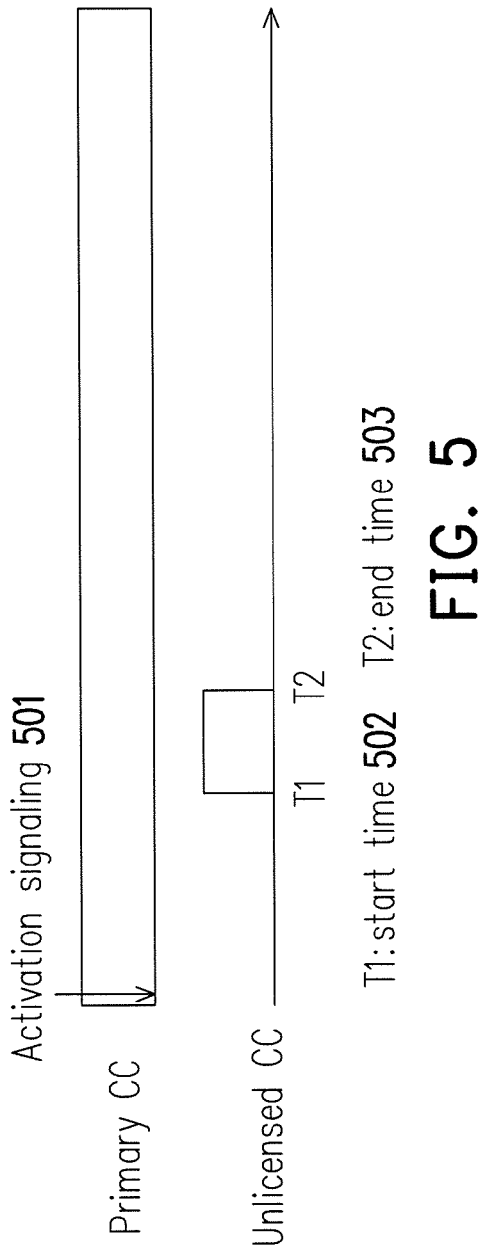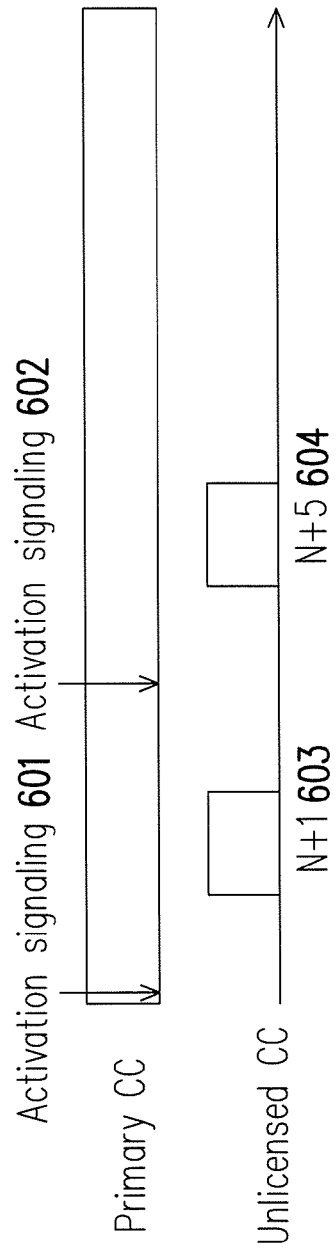

UNLICENSED SPECTRUM SHARING METHOD, BASE STATION USING THE SAME, AND USER EQUIPMENT USING THE SAME

CROSS REFERENCE TO RELATED APPLICATION

This application is a continuation-in-part application of and claims the priority benefit of a prior application Ser. No. 14/277,813, filed on May 15, 2014, now pending. The prior application Ser. No. 14/277,813 claims the priority benefits of U.S. provisional application Ser. No. 61/894,138, filed on Oct. 22, 2013, U.S. provisional application Ser. No. 61/902,298, filed on Nov. 11, 2013, U.S. provisional application Ser. No. 61/922,102, filed on Dec. 31, 2013, and U.S. provisional application Ser. No. 61/922,105, filed on Dec. 31, 2013. This application also claims the priority benefits of U.S. provisional application Ser. No. 62/011,579, filed on Jun. 13, 2014. The entirety of each of the above-mentioned patent applications is hereby incorporated by reference herein and made a part of this specification.

TECHNICAL FIELD

The present disclosure is directed to an unlicensed spectrum sharing method that is applicable to a user equipment and a base station, a user equipment using the same method, and a base station using the same method.

BACKGROUND

Conventionally, cellular systems operate in licensed spectrums in which a base station (BS) and one or more wireless devices may communicate through a wireless spectrum licensed to a wireless operator. Cellular network communication systems have been expanding their usage to unlicensed spectrum, which is also known as open spectrum or free spectrum. Some examples of the unlicensed spectrums are the Industrial, Scientific, and Medical (ISM) Band, the Unlicensed National Information Infrastructure (UNII) band, other unlicensed or shared spectrums, and so forth. Different countries may normally have different unlicensed spectrums as the regulations in each country might be different from other countries. The potential uses of unlicensed spectrums of LTE have gathered attentions of telecommunication equipment vendors and operators. One of the reasons for the recent attentions is because of the limited availability of licensed spectrums. In order to provide high throughput service to more users, LTE may resort to utilizing unlicensed spectrums for communications.

One of the major challenges is to operate the cellular system in an environment of uncertainty. As communications are conducted within the domain of unlicensed or shared spectrums, there could be other communication devices that would also like to use unlicensed or shared spectrums. These communication devices may belong to the same or different radio access technologies. For example, wireless communication operations that are normally conducted within the spectrums reserved for Long Term Evolution (LTE) wireless communication system may prefer to co-exist with Wi-Fi radios in the free spectrum that is normally used by Wi-Fi radios. However, within the unlicensed band, a LTE device might not be able to freely transmit or receive at any given time because of limitations related to spectrum sharing. This problem would not exist in a convention cellular LTE system in which the transmission and reception operations are normally scheduled and would not conflict with operations that occur in the free spectrum.

In order to cope with the uncertainty of transmitting and receiving opportunities in the unlicensed spectrum, a free spectrum sharing method could be devised such that wireless communication devices that normally use the license spectrum may utilize a free spectrum without conflicting with devices that normally use the unlicensed spectrum.

For general information related to licensed-assisted access to unlicensed spectrum, technical specification 3GPP TR 36.889 V0.3.1 dated February 2015 titled *3rd Generation Partnership Project; Technical Specification Group Radio Access Network; Study on Licensed-Assisted Access to Unlicensed Spectrum*; (*Release* 13) contains definitions to concepts and teens and is hereby incorporated by reference. For further information related to licensed-assisted access or licensed-assisted carrier aggregation in unlicensed spectrum, 3GPP TSG RAN WG2 #89 R2-150234 titled *Scenarios and Requirements for LAA* may also contain related concepts and terms and is hereby incorporated by reference.

SUMMARY OF THE DISCLOSURE

Accordingly, the disclosure is directed to a unlicensed spectrum sharing method that is applicable to a user equipment and a base station, a user equipment using the same method, and a base station using the same method In one of the exemplary embodiments, the disclosure is directed to a unlicensed spectrum sharing method applicable to a user equipment. The method would include receiving a configuration message over a first component carrier in a licensed spectrum to operate in an unlicensed spectrum, receiving a user message of the UE over a second component carrier in the unlicensed spectrum in response to receiving the configuration message, wherein the first component carrier and the second component carrier are aggregated carriers, and receiving a re-configuration message over the first component carrier in the licensed spectrum to operate in the unlicensed spectrum.

In one of the exemplary embodiments, the disclosure is direct to a user equipment that includes a receiver that receives wireless transmission and a processing circuit coupled to the receiver. The processor is configured for receiving via the receiver a configuration message over a first component carrier in a licensed spectrum to operate in an unlicensed spectrum, receiving via the receiver a user message of the UE over a second component carrier in the unlicensed spectrum in response to receiving the configuration message, wherein the first component carrier and the second component carrier are aggregated carriers, and receiving via the receiver a re-configuration message over the first component carrier in the licensed spectrum to operate in the unlicensed spectrum.

In one of the exemplary embodiments, the disclosure is directed to an unlicensed spectrum sharing method applicable to a base station. The method would include transmitting a configuration message over a first component carrier in a licensed spectrum to operate in an unlicensed spectrum, transmitting a user message over a second component carrier in the unlicensed spectrum in response to receiving the configuration message, wherein the first component carrier and the second component carrier are aggregated carriers, and transmitting a re-configuration message over the first component carrier in the licensed spectrum to operate in the unlicensed spectrum.

In one of the exemplary embodiment, the disclosure is directed to a base station a transmitter that transmits wireless transmission and a processing circuit coupled to the transmitter. The processing circuit is configured for transmitting via the transmitter an activation message over a first component carrier in a licensed spectrum to operate in an unlicensed spectrum, transmitting via the transmitter a user message over a second component carrier in the unlicensed spectrum in response to receiving the configuration message, wherein the first component carrier and the second component carrier are aggregated carriers, and transmitting via the transmitter a re-configuration message over the first component carrier in the licensed spectrum to operate in the unlicensed spectrum.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 1B illustrates configuring a subframe or time slot of a component carrier in an unlicensed frequency spectrum in accordance with one of the exemplary embodiments of the disclosure.

FIG. 3 illustrates activation signaling messages with delay in accordance with one of the exemplary embodiments of the disclosure.

FIG. 4 illustrates activation signaling messages with time duration in accordance with one of the exemplary embodiments of the disclosure.

FIG. 5 illustrates activation signaling messages with start time and end time in accordance with one of the exemplary embodiments of the disclosure.

FIG. 6 illustrates activation signaling messages having system frame number and subframe number in accordance with one of the exemplary embodiments of the disclosure.

DETAILED DESCRIPTION OF DISCLOSED EMBODIMENTS

Figure 1A:
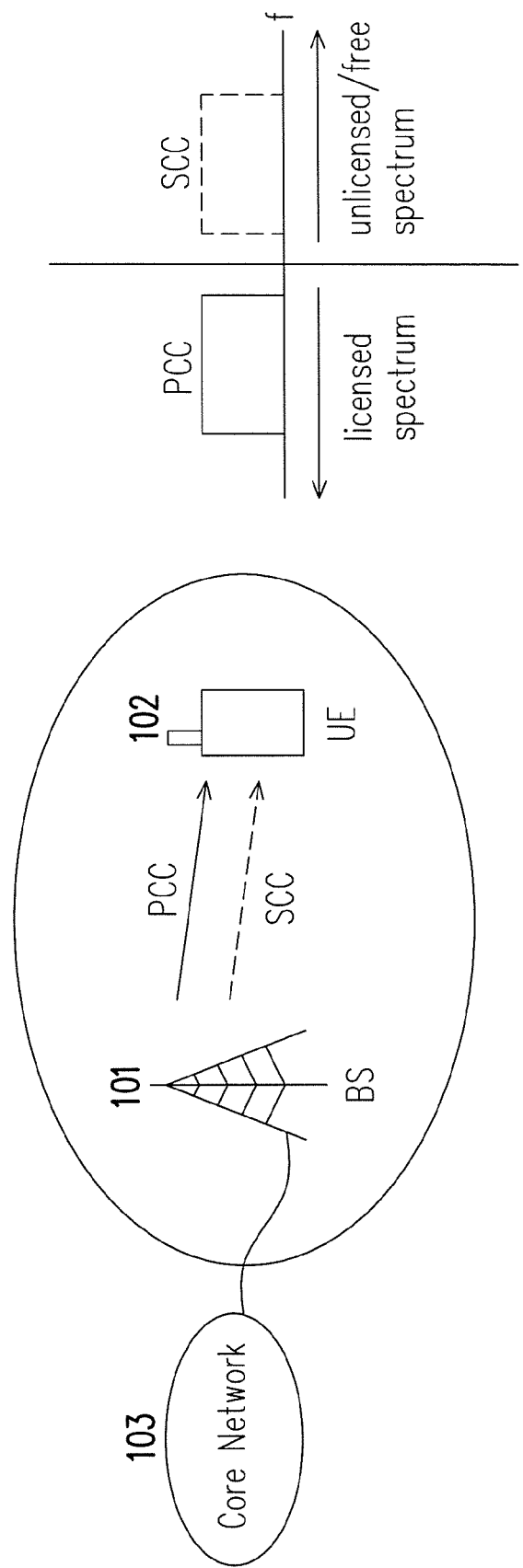
FIG. 1A illustrates an exemplary wireless communication system operating with carrier aggregation in both licensed frequency band and unlicensed frequency band.

Reference will now be made in detail to the present exemplary embodiments of the disclosure, examples of which are illustrated in the accompanying drawings. Wherever possible, the same reference numbers are used in the drawings and the description to refer to the same or like parts.

In an unlicensed band, a device that is normally configured to operate within a LTE communication system might not be able to freely transmit or receive within a unlicensed spectrum because of spectrum sharing with devices that are normally configured to operate within the unlicensed spectrum. For example, if a mobile phone would like to communication with a base station over an unlicensed spectrum, the mobile phone might conflict with another device that has established a Wi-Fi connection over the same unlicensed spectrum. Therefore, in order to cope with this uncertainty in transmitting and receiving opportunities, an unlicensed spectrum sharing method based on a carrier aggregation scheme could be utilized to transmit and receive via different component carriers.

As carrier aggregation has shown to be an effective way to increase data rate in LTE as well as the next generation broadband wireless communications, the carrier aggregation technique could also be used in the unlicensed spectrum. In particular, a first component carrier that operates in the licensed spectrum of a LTE communication system could be configured in conjunction with a second component carrier that operates in the unlicensed spectrum. One exemplary scenario is that the first component carrier could be implemented as a primary component carrier (PCC) in the licensed spectrum of a LTE communication system, and the second component carrier could be implemented as a secondary component carrier (SCC) in the unlicensed spectrum. "A primary serving cell could be served by a PCC in a licensed spectrum, and a secondary serving cell could be served by a SCC in an unlicensed spectrum." The first component carrier and the second component carrier are aggregated carriers under a carrier aggregation scheme, and also there could be multiple secondary component carriers over different none overlapping frequency blocks of an unlicensed spectrum. The configuration, activation, and signaling mechanisms for a SCC could be different from PCC which could be a conventional carrier that is signaled, configured, and activated based on the conventional mechanisms. For example, signaling messages could be transmitted in the PCC which is operated as a component carrier in the licensed spectrum of a LTE communication system, while some or all data packets could be transmitted in one or more SCC's that operates in an unlicensed spectrum.

Also, in order to improve the flexibility of radio resource allocation for operations in the unlicensed spectrum, a dynamic radio resource configuration and activation mechanism for configurable component carriers could be applied. The dynamic radio resource configuration and activation mechanism is a technical scheme that manages a component carrier by, for example, activating or set dormant specific subframes of a radio frame dynamically according to the current unlicensed band usage/interference conditions. By dynamically activating or setting dormant of some subframe (or time slots) in a component carrier of the unlicensed spectrum, the co-existence between the conventional LTE operation in the license spectrum and the LTE operation (or other wireless system operator) in the unlicensed spectrum could be realized.

For example, if a downlink transmission in the unlicensed spectrum is not possible because of potential interference by another on-going transmission originated from a device that normally operates under the unlicensed spectrum, a user equipment (UE) might be notified about certain subframes (or time slots) to be set dormant through a control plane in a primary component carrier in the license spectrum. In this way, the potential interference could be mitigated. For another example, if a base station or an eNB that supports LTE operation in an unlicensed spectrum prepares to use a component carrier or data transmission in the unlicensed spectrum, the base station may dynamic activate one or more subframes (or active time slots) for transmission. In addition, signaling messages may include an indicator or management information to notify a device about the availability or status of operations in the unlicensed spectrum. The aforementioned concepts are to be further elucidated by FIG. 1A~1E and their corresponding written descriptions in further details.

FIG. 1A illustrates an exemplary wireless communication system operating with carrier aggregation in both licensed frequency band and unlicensed frequency band. The exemplary wireless communication system may include not limited to at least one base station (e.g., BS 101) or evolved Node B (eNB) and at least one UE (e.g., UE 102) attached to a serving base station such as BS 101. A base station (e.g., BS 101) may attach to a core network 103 by interfacing with apparatuses such as a SON server, a MME, a network controller, and RNC. A wireless device (e.g., UE 102) may communicate with a base station (e.g., BS 101) by using both licensed spectrum and unlicensed spectrum. Also, a carrier aggregation technique could be used in the exemplary wireless communication system. The carrier aggregation technique may utilize at least but not limited to a first component carrier in the license spectrum and a second component carrier in the unlicensed spectrum. Therefore, a UE (e.g., UE 102) that is capable of communicating over the unlicensed spectrum would be able to support communication over at least two different radio frequency (RF) spectrums with one spectrum used for license band communications and another spectrum used for unlicensed band communications. For the exemplary wireless communication system of FIG. 1A, a PCC and a SCC could be aggregated to facilitate a communication between the BS 101 and the UE 102 by using the PCC in the licensed spectrum and SCC in the unlicensed spectrum. For example, PCC could be used to transmit control signaling between the BS 101 and the UE 102 while user data of UE 102 could be transmitted over the SCC.

In general, signaling messages for unlicensed band component carrier configuration such as a dynamic activation of subframes or some time slots) could be transmitted in the licensed band carrier, which might be a regular cellular (e.g., LTE) component carrier. A configurable carrier in unlicensed band might be used as a secondary component carrier (SCC) in carrier aggregation operation. Thus, dynamic radio resource allocation mechanism could be used for unlicensed band communications.

FIG. 1B illustrates configuring a subframe or time slot of a component carrier in an unlicensed frequency spectrum in accordance with one of the exemplary embodiments of the disclosure, and FIG. 1A and FIG. 1B are referred together. The BS 101 of FIG. 1A may configure certain subframe (or time slots) as an uplink subframe (or time slot) or as a downlink subframe, or as a special subframe between the BS 101 and a UE (e.g., UE 102) attached to the BS 101. The configuration of the subframes could be based on the current network traffic. For instance, if the current network traffic requires a lot of downlinks, more subframes could be configured as downlink subframes. For the example of FIG. 1B, a radio frame in the unlicensed spectrum is assumed to have at least 5 subframes per radio frame, but it would apparent for an ordinary person skilled in the art that the unlicensed spectrum could be configured for any number of subframes or time slots per radio frame. In step S101, the BS 101 configures and activates subframes 0, 2, and 4 for transmission while subframes 1 and 3 are not configured and thus remain dormant. The configuration and activation by the BS 101 may occur simultaneously in response to the same signaling message; otherwise, the activation could be subsequent to the configuration in response to different signaling messages. Any one of the subframe 0, 2, and 4 could be one of a downlink subframe, an uplink subframe, and a special subframe according to the needs of the communication system. For example, in an unlicensed band component carrier, subframes (or some time slots or some time periods) might be dynamically activated.

Similarly, in an unlicensed band component earlier, subframes (or some time slots or some time periods) could be dynamically set to dormant. Signaling messages for component carrier configuration (e.g., dynamic dormant of subframes) could be transmitted in the control plane over a licensed spectrum. A component carrier with the capability to set some subframes into dormant could be used as an unlicensed band component carrier in carrier aggregation operation.

Figure 1C:
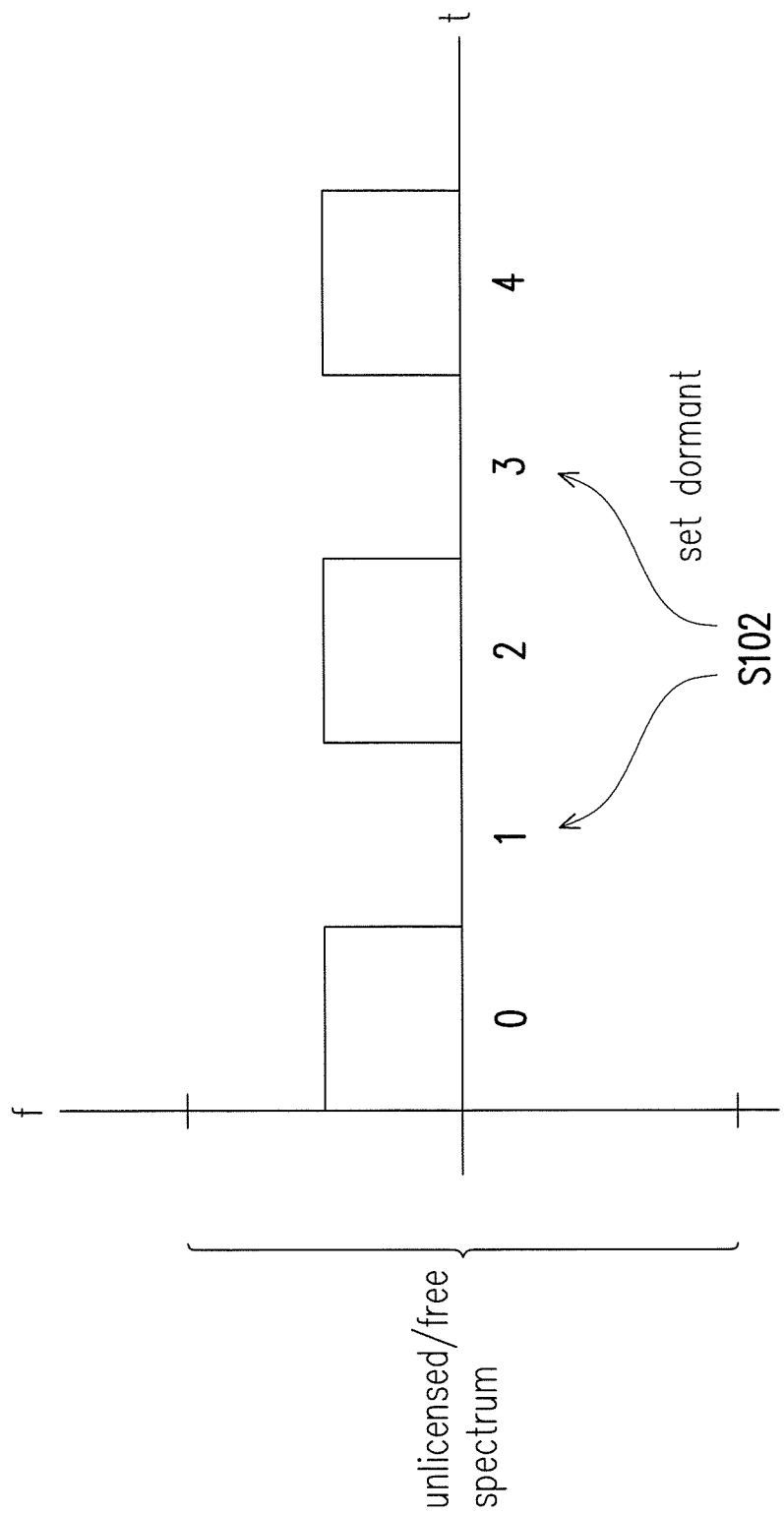
FIG. 1C illustrates setting dormant a subframe or time slot of a component carrier in an unlicensed frequency spectrum in accordance with one of the exemplary embodiments of the disclosure.

FIG. 1C illustrates setting dormant a subframe or time slot of a component carrier in an unlicensed frequency spectrum in accordance with one of the exemplary embodiments of the disclosure, and FIG. 1C and FIG. 1A are referred together. Assuming that subframes 0~4 have been configured and activated for communication, in step S102, the BS 101 may configure subframes 1 and 3 to be set dormant and subsequently transmit a signaling message to UE 102 so as to inform the UE about the re-configuration of subframes 1 and 3. The re-configuration and setting dormant by the BS 101 may occur simultaneously in response to the same signaling message; otherwise, the setting dormant could be subsequent to the configuration in response to different signaling messages. Signaling messages are introduced in FIG. 1D and its corresponding written descriptions in further details.

In general, the decision for sending signaling message to activate or set dormant subframes in a component carrier of an unlicensed spectrum could be based on the interference condition as well as the traffic condition. For example, a subframe or time period or time slot could be activated if there is not another device transmitting in the same unlicensed spectrum within the activated time period. Also, more activations of subframes or time period or time slots could be used when the current network traffic is high.

Figure 1D:
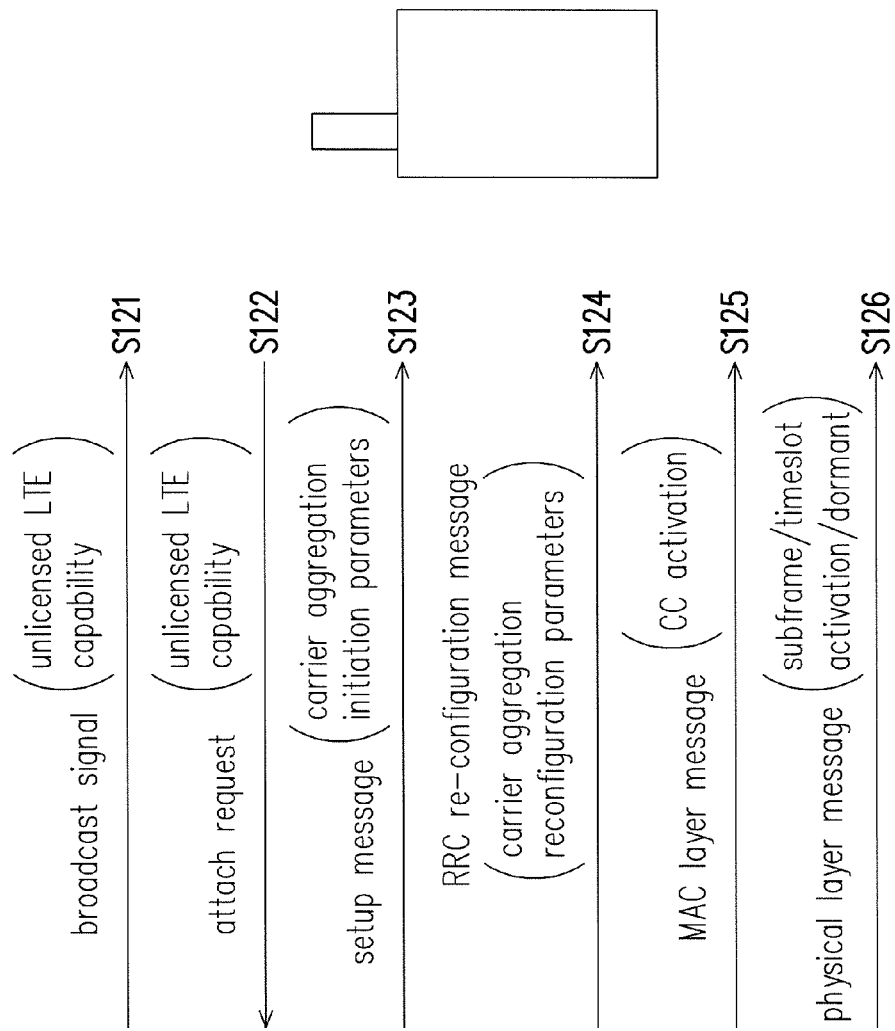
FIG. 1D illustrates signaling messages exchanged between a base station and a user equipment in order to operate within an unlicensed frequency spectrum in accordance with one of the exemplary embodiments of the disclosure.

A BS may control a UE by using one or a combination of signaling messages shown in FIG. 1D which illustrates signaling messages exchanged between a base station and a user equipment in order to operate within an unlicensed frequency spectrum. It should be noted that the steps in FIG. 1D do not require the same specific sequence nor is the disclosure limited to the exact same signaling messages. In step S121, a BS may transmit or broadcast a signaling message to a UE, and the signaling message may include an indicator that indicates the capability for the BS to support LTE operation in an unlicensed spectrum. For example, the indicator could be a flag that is one bit or more in a new system information block (SIB) that is not currently used. Alternatively, instead of transmitting the indicator in a SIB, the indicator could be transmitted from a BS to a UE or a group of UE during a UE attachment process. The indicator could be transmitted in a new or embedded in a currently existing message through a broadcast channel or through multicasting.

In step S122, a UE may indicate the capability to implement LTE wireless communication in an unlicensed spectrum in an indicator and transmit the indicator to a BS. The indicator could be embedded in an Attachment Request message. The indicator may implicitly mean that the UE would also support dynamic activation and dynamic setting dormant of a LTE component carrier in an unlicensed spectrum, or additional indicators could be required to indicate the support for dynamic activation and setting dormant.

In step S123, a BS may configure the LTE operation in an unlicensed spectrum by transmitting one or more initiation parameters to a UE. The initiation parameters could be a selection of a pre-existing uplink-downlink configuration (e.g., LTE TDD uplink-downlink configuration 0~7). Based on the demand of the current network traffic, a BS may initiate a UE for LTE operations in an unlicensed spectrum by transmitting carrier aggregation initiation parameters to the UE such as to select a from a pre-existing TDD uplink-downlink configuration. Alternative or additionally, the initiation parameters could include what subframes to be configured as downlink, uplink, or special and what subframes to remain dormant. During a setup procedure of a component carrier of an unlicensed spectrum, the above mentioned initiation information could be included in a setup message signaling for carrier aggregation initialization.

Moreover, during the UE attach process, a RRC signaling message such as a RRC reconfiguration message may include one or more indicators or descriptions of the LTE operation in an unlicensed spectrum as the aforementioned initiation parameters. For example, an indicator could be used to indicate that a component carrier will operate in an unlicensed spectrum. For example, an index (or information element) could be used to indicate what secondary component carrier will operate in what channel in an unlicensed spectrum, since there could be many possible channels after the channelization of the ISM band. The index (or information element) may also or alternatively indicate what unlicensed band (e.g., 2.4 GHz, 5 GHz, 3.5 GHz) is to be used. Each of the different unlicensed bands could be represented by a band identification number or index.

In step S124, a BS may re-configure the LTE operation in an unlicensed spectrum by transmitting one or more re-configuration parameters to a UE. In particular, the dynamic radio resource capability and configuration could be re-configured while communications using component carriers in an unlicensed spectrum are already in operation. For example, a RRC re-configuration message transmitted from a BS to a UE may include an indicator for the capability to support LTE operations in an unlicensed spectrum and the configurations for LTE operations in the unlicensed spectrum.

For example, a signaling message such as a RRC re-configuration message could be transmitted from a BS to re-configure what unlicensed band to be used for communications. Because of the channelization, there could be numerous unlicensed band channels to select from. For example, there are 11 channels for 802.11 to use in 2.4 GHz ISM band. A BS may re-configure a UE to use a different channel based on the interference conditions or traffic demands of the network. Therefore, the re-configuration parameters that could be embedded in a RRC-reconfiguration message may include a channel index, a carrier frequency index, and so forth.

In step S125, a BS could transmit a signaling message to activate a component carrier. In one of the exemplary embodiments, a component carrier in an unlicensed spectrum is configured and activated. However, alternatively, after a component carrier in an unlicensed spectrum is configured, the component carrier might not actually be activated, and the activation of a component carrier would be needed before the component carrier is used to carry data. In order to activate a component carrier after it has been configured, the BS could utilize, for example, a control element with Scell activation within a media access control (MAC) layer message.

In step S126, a BS may alter the configuration of individual subframe or time slot of a component carrier in an unlicensed spectrum. Since the unlicensed spectrum could be shared by multiple parties, the alteration of the configuration of individual subframe or time slot would likely require a relatively fast adaption speed and also the unlicensed band could be shared by multiple parties in order to quickly configure, activate, or set dormant a specific subframe or time slot of a component carrier in the unlicensed spectrum. Therefore a physical layer channel control signaling could be used to quickly configured, activate, or set dormant a certain subframe.

For example, a physical downlink control channel (PDCCH) could be used for a base station to alter the configuration of a subframe or time slot. A radio network temporarily identifier (RNTI) could be used to identify the receiver of PDCCH such that a UE may obtain the new configuration of a subframe or time slot upon decoding the PDCCH with the radio network temporarily identifier (RNTI). Each UE could be identifier by a unique RNTI per UE. Alternative, a RNTI could be used to identifier all UEs within a cell or a group of UEs for dynamic radio resource allocation. Also, an unlicensed channel RNTI could be used to signal all UEs that use the same unlicensed channel. The control signals that carries the PDCCH and RNTI as previously mentioned could be transmitted in the control plane in the PCC of a licensed band normally reserved for LTE communications.

Figure 1E:
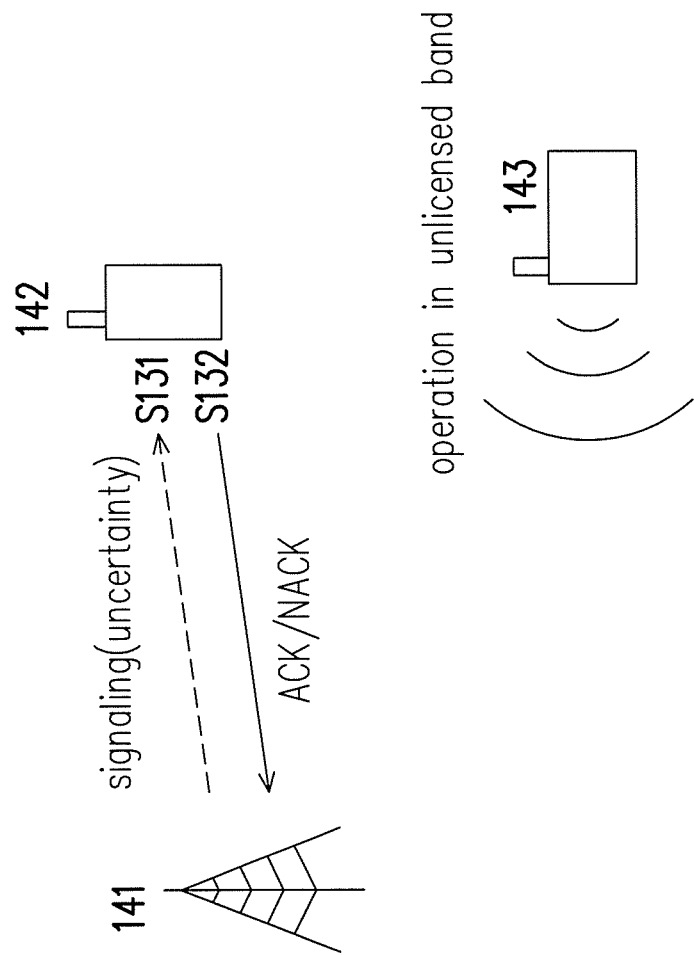
FIG. 1E illustrates a mechanism to handle an ongoing-operation in unlicensed frequency spectrum in accordance with one of the exemplary embodiments of the disclosure.

Since LTE operations over an unlicensed spectrum might not always be successful as another device may have an on-going transmission in the unlicensed spectrum that is intended to be used, a mechanism to handle an ongoing operation in an unlicensed spectrum could be proposed. FIG. 1E illustrates a mechanism to handle an ongoing-operation in an unlicensed frequency spectrum in accordance with one of the exemplary embodiments of the disclosure. In step S131, a BS 141 may transmit a signaling message, which includes an uncertainty indicator to indicate the uncertainty of communications in an unlicensed band to a UE 142. The transmission of the signaling message having the uncertainty indicator may or may not be the result of a detection. Optionally, the BS 141 may perform a detection and have discovered that a second device 143 has already been using the unlicensed spectrum. Optionally, the UE 142 may also transmit a feedback signaling message to report whether uncertain data transmission is detected or not. In response to receiving the uncertainty indicator, the UE 142 in step S131 may transmit a feedback signal to indicate whether the uncertain data transmission is correctly received by, for example, transmitting an ACK signal or incorrectly received by transmitting, for example, a NACK signal.

In one of the exemplary embodiments, the BS 141 may transmit a re-configuration message to re-configure the UE 142 based on the result of the detection of the second device 143 or based on whether an ACK or NACK has been received. For example, upon the detection of the second device 143 which uses a specific channel that would conflict with the communication between the BS 141 and the UE 142, the BS 141 may transmit a reconfiguration message (e.g., S124) having updated carrier aggregation reconfiguration parameters that would change the communication to a different channel or to a different secondary component carrier. Similarly, the BS 141 may also switch to a different channel upon receiving a NACK from the UE 142. The BS 141 may also transmit a physical layer message (e.g., S126) to set certain subframe or time slot to dormant upon detecting that the interference condition is severe at a certain time period.

Figure 2:
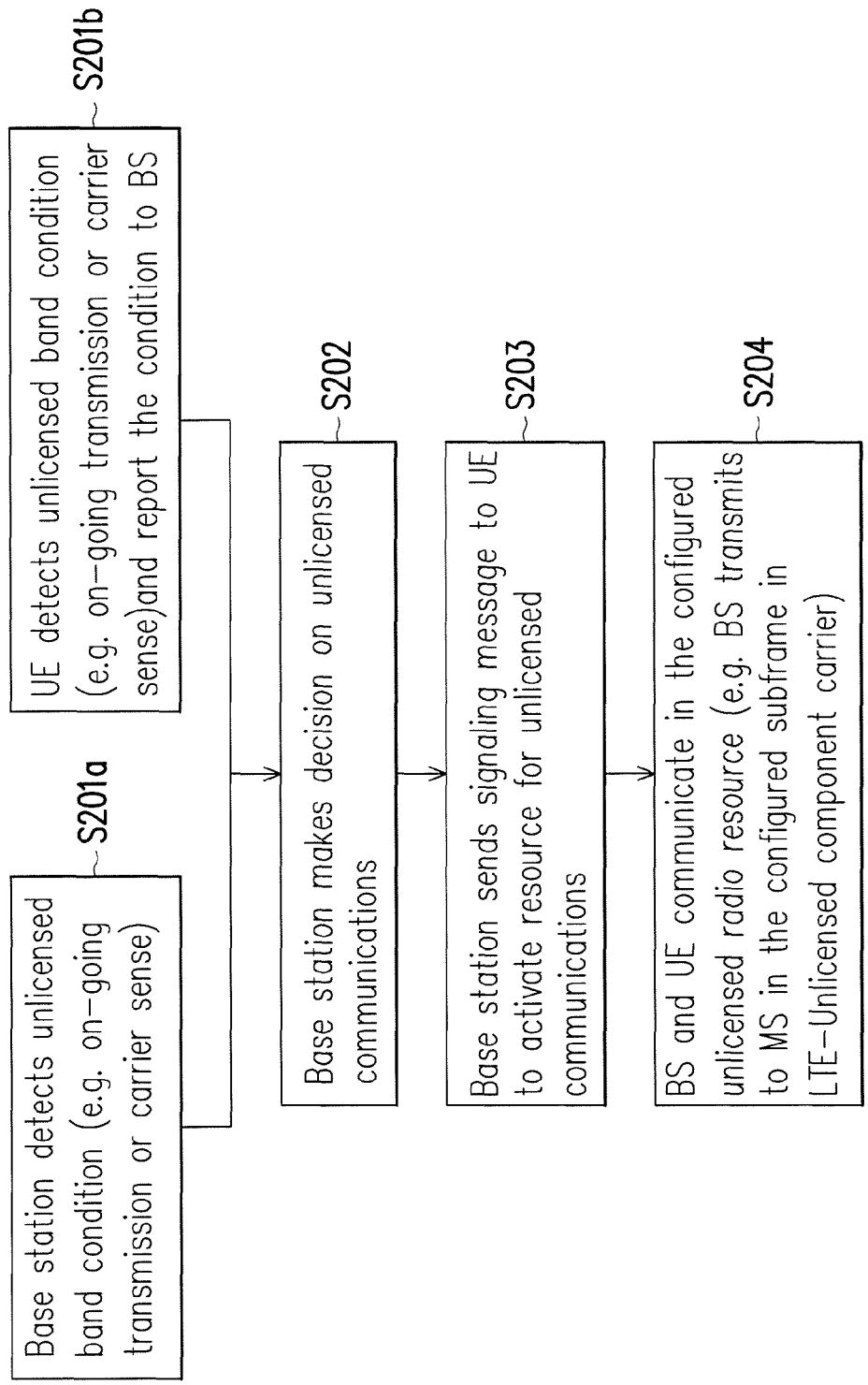
FIG. 2 is a flow chart that illustrates the activation of wireless communication in unlicensed frequency spectrum in accordance with one of the exemplary embodiments of the disclosure.

FIG. 2 is a flow chart that illustrates the activation of wireless communication in unlicensed frequency spectrum in accordance with one of the exemplary embodiments of the disclosure. In the optional step S201a, a BS may detect the condition of an unlicensed spectrum such as whether there is an ongoing transmission that is currently taking place in the unlicensed spectrum. Similarly, in the optional step S201b, a UE may detect the condition of the unlicensed spectrum such as whether there is an ongoing transmission that is currently taking place in the unlicensed spectrum. In step S202, the BS may determine whether to communicate over an unlicensed spectrum based on the result of S201a and/or S201b. In step S203, assuming that the BS has determined to communication over the unlicensed spectrum, the BS may transmit a signaling message to a UE to configure and activate a radio resource in the unlicensed spectrum. In step S204, the BS and the UE would communicate in the configured and activated radio resource in the unlicensed spectrum after the BS transmits to the UE information of the configuration of subframes or time slots of a component carrier of the unlicensed spectrum.

In one of the exemplary embodiments, Step 201a and Step 201b could both be used to collecting information in the unlicensed band. In another of the exemplary embodiments, only one of Step 201a or Step 201b would be used. The reporting message transmission in Step 201b could be sent in a licensed band such as a regular LTE component carrier. Also the signaling message transmission in Step 203 could be sent in a licensed band such as the regular LTE component carrier.

In order to avoid interference or to adapt to the current traffic condition, the activation of a component carrier in the unlicensed spectrum could be configured with a delay. FIG. 3 illustrates activation signaling messages with delay in accordance with one of the exemplary embodiments of the disclosure. For this exemplary embodiment, a BS may transmit via a PCC an activation signaling message 301 to activate a SCC in an unlicensed spectrum with a delay time value 302 so that the activation of the SCC will start immediately after the delay time value 302. In addition, the activation signaling message may also include a delay time duration 303 such that the unlicensed band communication would commence after the delay time value 302 plus the delay time duration 303 value.

FIG. 4 illustrates activation signaling messages with time duration in accordance with one of the exemplary embodiments of the disclosure. For this exemplary embodiment, a BS may transmit via a PCC an activation signaling message 401 to activate a SCC in an unlicensed spectrum. The activation signaling message 401 may contain an activation time duration 402 value which would describe the time duration for the activation of the SCC. In other words, the activation time duration 402 would dictate the length of time the communication in the unlicensed spectrum would take place. Upon the expiration of the activation time duration 402, the SCC could automatically be set to dormant without additional signaling messages.

FIG. 5 illustrates activation signaling messages with start time and end time in accordance with one of the exemplary embodiments of the disclosure. For this exemplary embodiment, a BS may transmit via a PCC an activation signaling message 501 to activate a SCC in an unlicensed spectrum. The activation signaling message 501 may contain T1, an activation start time 502, and T2, an activation end time 503. In this way, the communication over unlicensed spectrum would not commence until T1 and will be over at T2.

An activation signaling message may also include a subframe or time slot number as well as the corresponding configuration information (e.g., uplink, downlink, special) of the subframe or time slot. FIG. 6 illustrates activation signaling messages having system frame number and/or subframe number in accordance with one of the exemplary embodiments of the disclosure. In this exemplary embodiment, a BS transmits an activation signaling message 601 to a UE over the PCC to configure a SCC in an unlicensed spectrum. The first activation signaling message 601 may contain information including a system frame number and a subframe number of the radio frame that corresponds to the system frame number so as to identify the subframe 603 to be configured and activated. Similarly, the second activation signaling message 602 may contain similar information so as to identify the subframe 604 to be configured and activated. Moreover, the first activation signaling message 601 may for example configure the subframe 603 as a downlink subframe, and the second activation signaling message 602 may for example configure the subframe 604 as an uplink subframe. It should be noted that, alternatively, the first activation signaling message 601 may configure and/or activate both subframe 603 and subframe 604.

Figure 7:
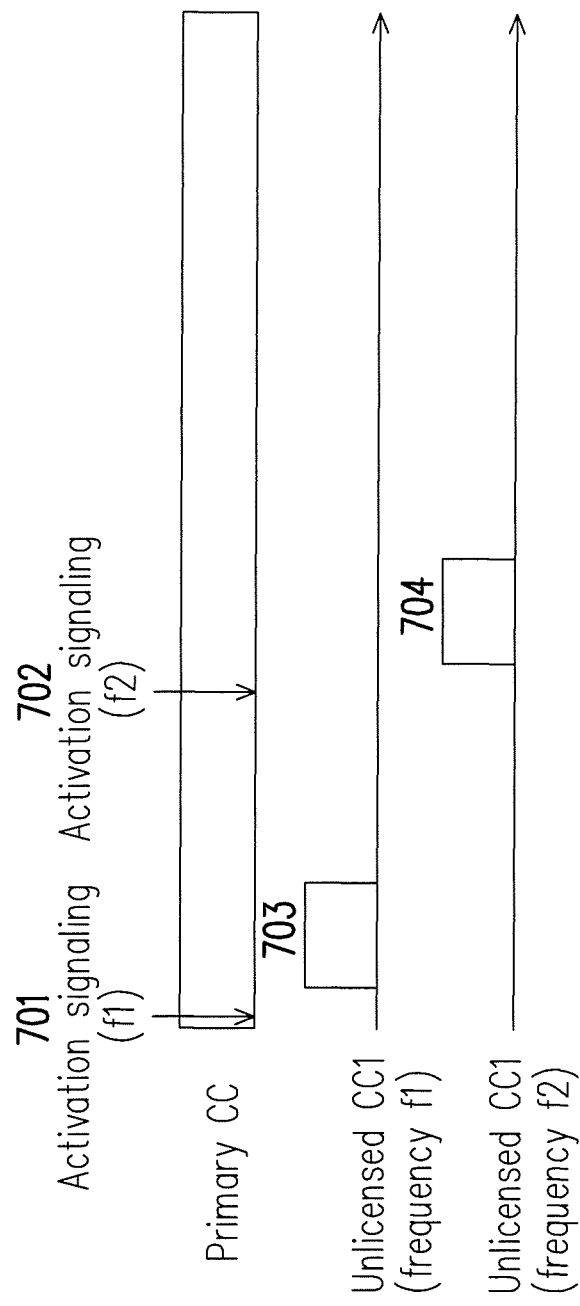
FIG. 7 illustrates the use of multiple component carriers in an unlicensed frequency spectrum in accordance with one of the exemplary embodiments of the disclosure.

Furthermore, an activation signaling message may further include a carrier frequency which identifies a SCC in an unlicensed spectrum as well as a channel ID of the SCC in the unlicensed spectrum. In this way, dynamic carrier frequency selection as well as dynamic channel hopping could be implemented in the unlicensed spectrum in order to quickly adjust to the interference condition and traffic situation. FIG. 7 illustrates the use of multiple component carriers in an unlicensed frequency spectrum in accordance with one of the exemplary embodiments of the disclosure. For this exemplary embodiment, a base station may transmit a first activation signaling message 701 which carries frequency information f1 and channel information over PCC to configure a SCC of frequency f1 in an unlicensed spectrum so that the subframe 703 of frequency f1 could be configured to use a specific channel of the SCC of frequency f1. Similarly, in response to a change of interference condition or traffic situation, a base station may transmit a second activation signaling message 702 which carries frequency information f2 and channel information over PCC to configure a SCC of frequency f2 in an unlicensed spectrum so that the subframe 704 of frequency f2 could be configured to use a specific channel of the SCC of frequency f2. In this way, a UE that previously operates using SCC of f1 could later on switch over to using SCC of f2.

Figure 8:
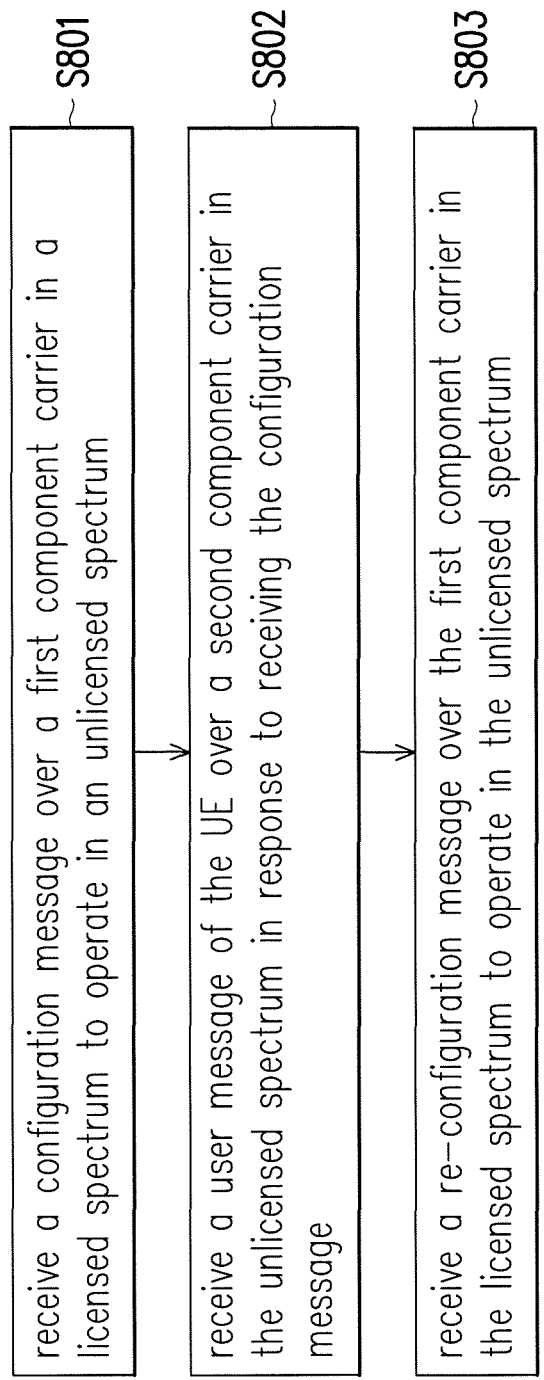
FIG. 8 illustrates a summary of the proposed unlicensed spectrum sharing method from the perspective of a user equipment in accordance with one of the exemplary embodiments of the disclosure.

FIG. 8 illustrates a summary of the proposed unlicensed spectrum sharing method from the perspective of a user equipment in accordance with one of the exemplary embodiments of the disclosure. In step S801, the UE would receive a configuration message over a first component carrier in a licensed spectrum to operate in an unlicensed spectrum. In step S802, the UE would receive a message of the UE over a second component carrier in the unlicensed spectrum in response to receiving the configuration message, wherein the first component carrier and the second component carrier are aggregated carriers. In step S803, the UE would receive a re-configuration message over the first component carrier in the licensed spectrum to operate in the unlicensed spectrum. The re-configuration message would adjust the operation in the unlicensed spectrum based on the traffic condition or interference situation. The aforementioned message could be a user message or a non-user message such as a machine generated message.

In one of the exemplary embodiments, the message transmitted over a second component carrier in the unlicensed spectrum may only include payload portion of the message (i.e., not including control signaling) while control signaling are only transmitted over a first component carrier in the licensed spectrum while the first component carrier and the second component carrier are the same aggregated carrier.

Figure 9:
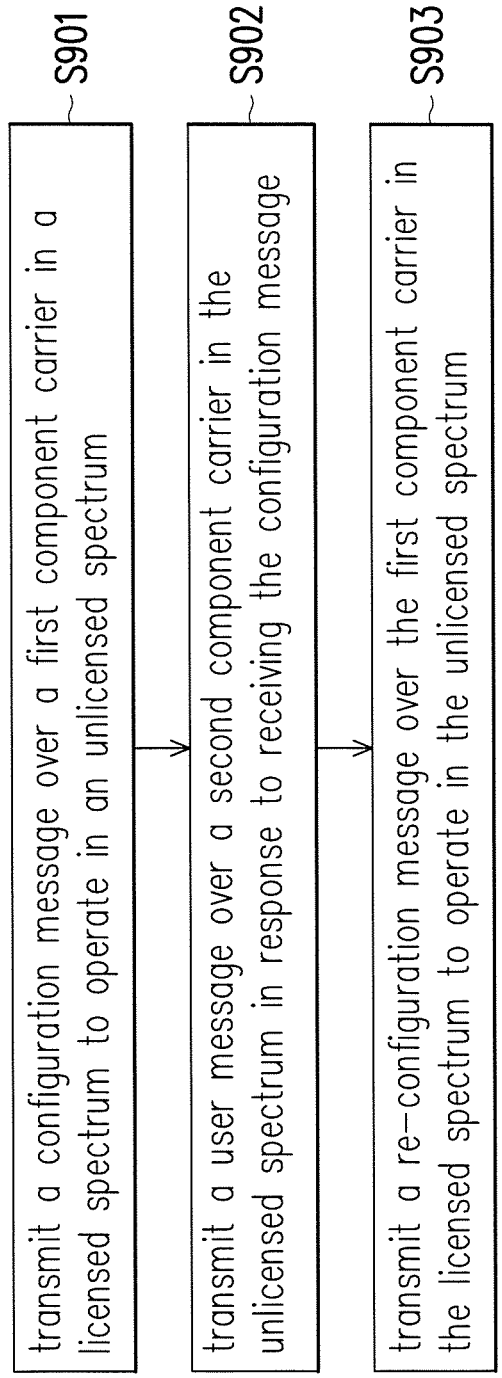
FIG. 9 illustrates a summary of the proposed unlicensed spectrum sharing method from the perspective of a base station in accordance with one of the exemplary embodiments of the disclosure.

FIG. 9 illustrates a summary of the proposed unlicensed spectrum sharing method from the perspective of a base station in accordance with one of the exemplary embodiments of the disclosure. In step S901, the base station would transmit a configuration message over a first component carrier in a licensed spectrum to operate in an unlicensed spectrum. In step S902, the base station would transmit a message over a second component carrier n the unlicensed spectrum in response to receiving the configuration message, wherein the first component carrier and the second component carrier are aggregated carriers. In step S903, the base station would transmit a re-configuration message over the first component carrier in the licensed spectrum to operate in the unlicensed spectrum. The re-configuration message would adjust the operation in the unlicensed spectrum based on the traffic condition or interference situation. The aforementioned message could be a user message or a non-user message such as a machine generated message.

In one of the exemplary embodiments, the message transmitted over a second component carrier in the unlicensed spectrum may only include payload portion of the message (i.e., not including control signaling) while control signaling are only transmitted over a first component carrier in the licensed spectrum while the first component carrier and the second component carrier are the same aggregated carrier.

Figure 10:
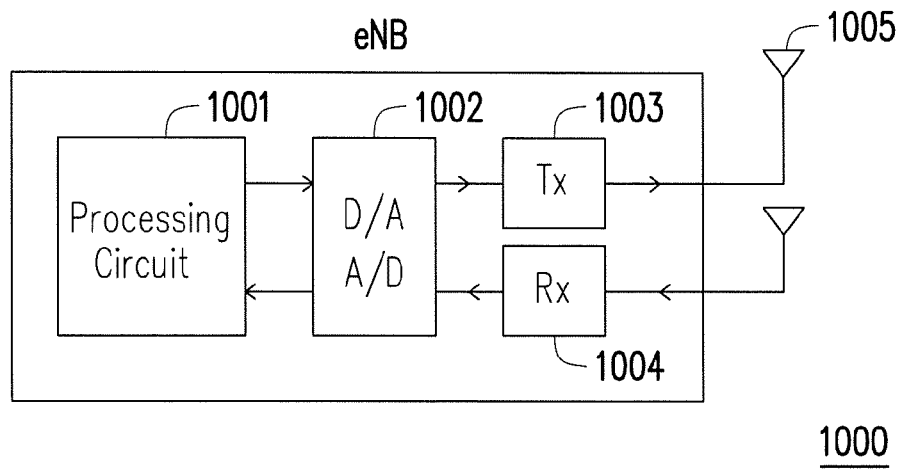
FIG. 10 illustrates an exemplary user equipment according to one of the embodiments of the disclosure.

FIG. 10 illustrates an exemplary base station according to one of the embodiments of the disclosure. The proposed base station would include at least but not limited to a processing circuit 1001 coupled to an analog-to-digital (A/D)/digital-to-analog (D/A) converter 1002, a transmitter 1003, a receiver 1004, and one or more antenna units 1005. The transmitter 1003 and receiver 1004 transmit downlink signals and receive uplink signals wirelessly. The transmitter 1003 would be involved with transmission of wireless data as aforementioned, and similarly the receiver 1004 would be involved with the reception of wireless data as aforementioned. The transmitter 1003 and receiver 1004 may also perform operations such as low noise amplifying, impedance matching, frequency mixing, up or down frequency conversion, filtering, amplifying, and so like. The (A/D)/(D/A) converter 1002 is configured to convert from an analog signal format to a digital signal format during uplink signal processing and from a digital signal format to an analog signal format during downlink signal processing.

The processing circuit 1001 is configured to process digital signal and to perform procedures of the proposed method of unlicensed spectrum sharing method in accordance with the aforementioned exemplary embodiments of the present disclosure. Also, the processing circuit 1001 may optionally be coupled to a non-transitory storage medium to store programming codes, device configurations, a codebook, buffered or permanent data, and so forth. The functions of the processing circuit 1001 could be implemented by using programmable units such as a micro-processor, a micro-controller, a DSP chips, FPGA, etc. The functions of the processing circuit 1001 may also be implemented with separate electronic devices or ICs, and the processing circuit may also be implemented with either hardware or software.

The term "base station" (BS) may represent any one of a Home Evolved Node B (HeNB), an eNB, an advanced base station (ABS), a base transceiver system (BTS), an access point, a home base station, a relay station, a scatterer, a repeater, an intermediate node, an intermediary, and/or satellite-based communications base stations.

Figure 11:
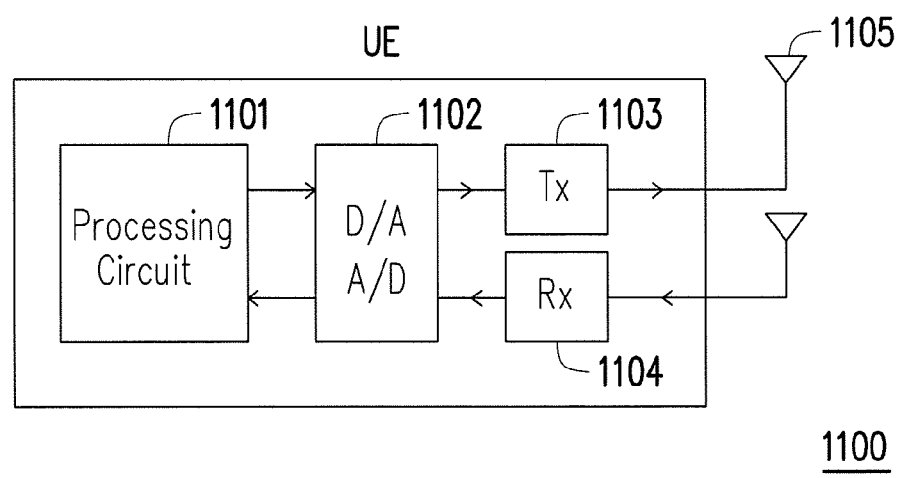
FIG. 11 illustrates an exemplary base station according to one of the embodiments of the disclosure.

FIG. 11 illustrates an exemplary user equipment in terms of functional block diagrams according to one of the embodiments of the disclosure. The UE contains at least but not limited to a processing circuit 1101, coupled to an analog-to-digital (A/D)/digital-to-analog (D/A) converter 1102, a transmitter 1103, a receiver 1104, and one or more antenna units 1105. The processing circuit 1101 would be involved in the implementation of the unlicensed spectrum sharing method as previously described. The transmitter 1103 would be involved with the transmission of wireless data as previously described, and the receiver 1104 would be involved with the transmission of wireless data as previously described. The functions of these components are similar to those of a base station, and thus a description of these functions will not be repeated.

The term "user equipment" (UE) in this disclosure could represent various embodiments which for example could include but not limited to a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and so like. In some applications, a UE may be a fixed computer device operating in a mobile environment, such as a bus, train, an airplane, a boat, a car, and so forth.

In the disclosure, one of the aims is to provide a solution for signaling and configuration methodology for dynamic subframe configuration of a LTE communication system that operates in the unlicensed spectrum. However, it would apparent to an ordinary person skilled in the art that the disclosure could also be applied to other communication systems, such as a 5G communication system, IEEE 802.11, IEEE 802.16, WiMAX to operate in the unlicensed spectrum.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. An unlicensed spectrum sharing method applicable to a user equipment, comprising:
   receiving a configuration message over a first component carrier in a licensed spectrum to operate in an unlicensed spectrum, wherein the configuration message comprises a delay time value associated with activating a second component carrier in the unlicensed spectrum, and the delay time value is used to delay the activation of the second component carrier in the unlicensed spectrum;
   receiving a message of the UE over the second component carrier in the unlicensed spectrum in response to receiving the configuration message, wherein the first component carrier and the second component carrier are aggregated carriers, wherein the configuration message activates a first time slot of the second component carrier and setting dormant a second time slot of the second component carrier; and
   receiving a re-configuration message over the first component carrier in the licensed spectrum to operate in the unlicensed spectrum.

2. The method of claim 1 further comprising:
   detecting a transmission of another UE in the unlicensed spectrum; and
   reporting the transmission of the another UE.

3. The method of claim 2, further comprising:
   receiving a notification for the transmission of the another UE in the unlicensed spectrum; and
   transmitting an acknowledgement of the notification.

4. The method of claim 1 further comprising:
   receiving a first indicator for a capability to transmit or receive over the second component carrier in the unlicensed spectrum; and
   transmitting a second indicator for a capability to transmit or receiving over the second component carrier in the unlicensed spectrum.

5. The method of claim 1 further comprising:
   receiving an activation message in the media access control (MAC) layer to use the second component carrier in the unlicensed spectrum in response to receiving the configuration message.

6. The method of claim 1 wherein receiving the re-configuration message over the first component carrier comprising:
   receiving the re-configuration message in the physical over the first component carrier to activate the first time slot or to set dormant the second time slot.

7. The method of claim 1, wherein the configuration message further comprising:
   a duration of the activation of the second component carrier in the unlicensed spectrum.

8. A user equipment comprising:
   a receiver that receives wireless transmission; and
   a processing circuit coupled to the receiver and is configured for:
   receiving via the receiver a configuration message over a first component carrier in a licensed spectrum to operate in an unlicensed spectrum, wherein the configuration message comprises a delay time value associated with activating a second component carrier in the unlicensed spectrum, and the delay time value is used to delay the activation of the second component carrier in the unlicensed spectrum;
   receiving via the receiver a message of the UE over the second component carrier in the unlicensed spectrum in response to receiving the configuration message, wherein the first component carrier and the second component carrier are aggregated carriers, wherein the configuration message activates a first time slot of the second component carrier and setting dormant a second time slot of the second component carrier; and
   receiving via the receiver a re-configuration message over the first component carrier in the licensed spectrum to operate in the unlicensed spectrum.

9. An unlicensed spectrum sharing method applicable to a base station, comprising:
   transmitting a configuration message over a first component carrier in a licensed spectrum to operate in an unlicensed spectrum, wherein the configuration message comprises a delay time value associated with activating a second component carrier in the unlicensed spectrum, and the delay time value is used to delay the activation of the second component carrier in the unlicensed spectrum;
   transmitting a user message over the second component carrier in the unlicensed spectrum in response to receiving the configuration message, wherein the first component carrier and the second component carrier are aggregated carriers, wherein the configuration message activates a first time slot of the second component carrier and setting dormant a second time slot of the second component carrier; and transmitting a re-configuration message over the first component carrier in the licensed spectrum to operate in the unlicensed spectrum.

10. The method of claim 9 further comprising:

detecting a transmission of a user equipment in the unlicensed spectrum; or receiving a report of the transmission of the user equipment in the unlicensed spectrum.

11. The method of claim 10 further comprising:

transmitting a notification for the transmission of the user equipment in the unlicensed spectrum; and receiving an acknowledge of the notification.

12. The method of claim 9 further comprising:

transmitting a first indicator for a capability to transmit or receive over the second component carrier in the unlicensed spectrum; and receiving a second indicator for a capability to transmit or receiving over the second component carrier in the unlicensed spectrum.

13. The method of claim 9 further comprising:

transmitting an activation message in the media access control (MAC) layer to use the second component carrier in the unlicensed spectrum in response to transmitting the configuration message.

14. The method of claim 9 wherein transmitting the re-configuration message over the first component carrier comprising:

transmitting the re-configuration message in the physical layer over the first component carrier to activate the first time slot or to set dormant the second time slot.

15. The method of claim 9, wherein the configuration message further comprising:

a duration of the activation of the second component carrier in the unlicensed spectrum.

* * * * *